C. QUAST.
TOOL HOLDER.
APPLICATION FILED FEB. 6, 1908.
954,049.
Patented Apr. 5, 1910.
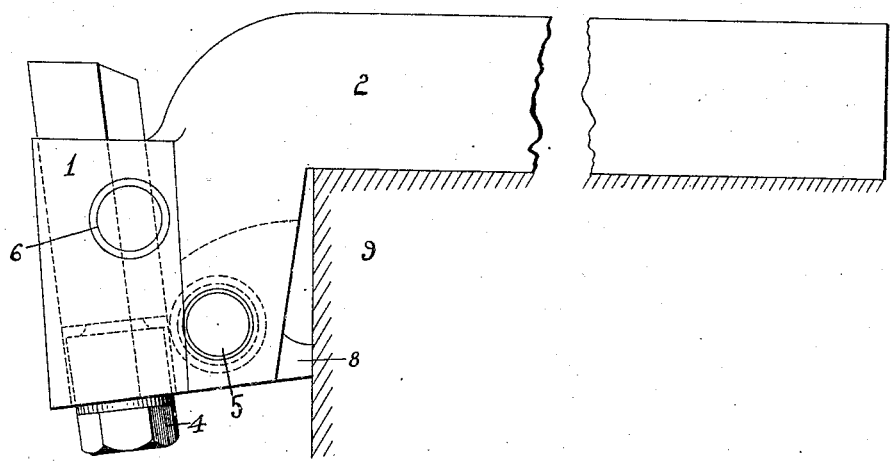
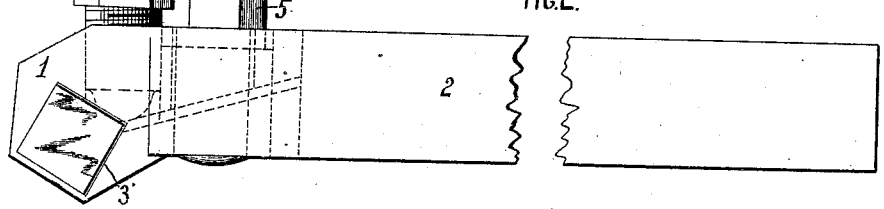
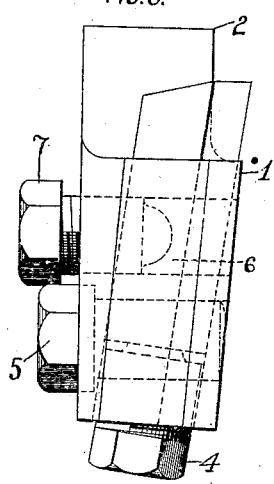
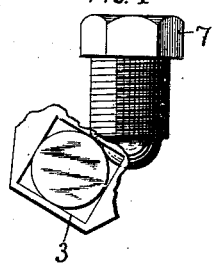
ATTEST.
Benth. Stahl.
Ewd L. Folson.
INVENTOR.
Chas. Quast.
BY Shear Middleton Donaldson Shear
ATTY'S.

UNITED STATES PATENT OFFICE.

CHARLES QUAST, OF CHICAGO, ILLINOIS.

TOOL-HOLDER.

954,049.  Specification of Letters Patent.  Patented Apr. 5, 1910.

Application filed February 6, 1908. Serial No. 414,588.

*To all whom it may concern:*

Be it known that I, CHARLES QUAST, citizen of the United States, residing at 377 Armitage avenue, Chicago, Illinois, have invented new and useful Improvements in Tool-Holders, of which the following is a specification.

My invention relates to improvements in tool holders and the main objects of the invention are to provide a simple, durable and efficient device in which the tool will be securely held against slipping and also from turning or moving sidewise. I have also aimed to provide a construction in which the entire head of the tool holder will be held against springing or slipping away from the work.

With these and other objects in view the invention includes the features of construction hereinafter set forth and particularly pointed out in the appended claims.

A tool holder constructed in accordance with my invention is shown in the accompanying drawing in which—

Figure 1 is a side elevation of such tool holder; Fig. 2 is a plan view of the same: Fig. 3 is an end view, and Fig. 4 is a detail showing the manner in which a tool having a cylindrical shank is held.

Referring by reference characters to these figures, the numeral 1 designates the head of the tool holder and 2 the shank. The head is provided with a passage or socket 3 which is of irregular cross section, for the greater portion of its length. At the lower end the passage is made circular and is internally threaded to receive a screw 4 against which the end of the tool abuts. The portion of the head adjacent this screw is split and engaged by a transverse clamping screw or bolt 5 by means of which the split portion may be clamped tightly upon the screw 4 to lock it in position after it has been properly adjusted. The screw 4 serves to receive the thrust upon the tool and to support it firmly against longitudinal displacement, at the same time permitting adjustment to regulate the height of the cutting edge.

In order to hold the tool firmly against any slipping or turning, irrespective of the shape of the tool in cross section a screw threaded opening 6 is formed in the head to one side of the center of the passage or socket 3 into which opening is inserted a screw 7 having a rounded or beveled end. This end, as the screw is tightened, tends to crowd the tool away from the screw and against the opposite walls with a powerful wedging action holding it rigidly between the two opposite walls and the contact point of the screw. It will be seen that by this construction I can hold the tool rigidly in place irrespective of whether it be square or round, or in fact any shape in which such tools are ordinarily made. In order to keep the tool holder itself from springing away from the work I provide the heel of the tool holder with a projection 8 which bears against the face of the tool post or slide of the machine.

Having thus described my invention what I claim is—

1. A tool holder having a socket to receive the tool and a binding screw threaded through the wall of the holder and having its end bearing directly against the tool on one side of the center thereof and tangentially or at an angle to the surface of the tool whereby the tool will be crowded transversely of the socket.

2. A tool holder having a socket to receive the tool and a binding screw threaded through the wall of the socket and having a beveled end bearing against the tool on one side of the center thereof and tangentially or at an angle to the surface of the tool whereby the tool will be crowded transversely of the socket.

In testimony whereof I have signed my name to this specification in the presence of two subscribing witnesses.

CHARLES QUAST.

Witnesses:
   WILLIAM A. NUSSBAUMER,
   JEAN HUBER.